United States Patent [19]

Weber

[11] Patent Number: 5,644,490

[45] Date of Patent: Jul. 1, 1997

[54] METHOD AND SYSTEM FOR ESTIMATING VEHICLE SPEED REFERENCE VALUE

[75] Inventor: Darryl C. Weber, Ann Arbor, Mich.

[73] Assignee: Kelsey-Hayes Company, Livonia, Mich.

[21] Appl. No.: 383,267

[22] Filed: Feb. 3, 1995

[51] Int. Cl.[6] .................................................. B60K 31/00
[52] U.S. Cl. ............................................. 364/426.018
[58] Field of Search ........................... 364/426.02, 426.03, 364/565, 426.018; 324/160, 166; 303/95, 109, 100, 102, 103, 105, 106; 180/197

[56] References Cited

U.S. PATENT DOCUMENTS

| | | | |
|---|---|---|---|
| 4,828,334 | 5/1989 | Salman | 303/100 |
| 4,902,076 | 2/1990 | Ushjima et al. | 303/100 |
| 5,150,299 | 9/1992 | Fujioka | 364/426.02 |
| 5,173,860 | 12/1992 | Walenty et al. | 364/426.02 |
| 5,242,216 | 9/1993 | Miyawaki et al. | 303/106 |
| 5,251,137 | 10/1993 | Chin et al. | 364/426.02 |
| 5,262,951 | 11/1993 | Beyer et al. | 364/426.02 |
| 5,265,944 | 11/1993 | Gloceri | 303/92 |
| 5,286,097 | 2/1994 | Myoi et al. | 303/99 |
| 5,316,379 | 5/1994 | Becker et al. | 303/100 |
| 5,454,630 | 10/1995 | Zhang | 303/175 |

*Primary Examiner*—Kevin J. Teska
*Assistant Examiner*—Stephen J. Walder, Jr.
*Attorney, Agent, or Firm*—MacMillan, Sobanski & Todd

[57] ABSTRACT

An improved method of estimating a vehicle speed reference value (VREF) at a wheel so as to prevent false slip detection and premature ABS activation in a motor vehicle equipped with an Anti-Locking Braking System. A maximum possible rate of change of velocity (ACCEL limit) for the vehicle is determined over a predetermined range of corresponding vehicle speeds. Wheel speed and estimated reference speed at the wheel (VREF) are determined along with the rate of change of the wheel speed (WHEEL ACCEL). The WHEEL ACCEL is compared to the corresponding ACCEL limit to limit the estimated reference speed to the corresponding ACCEL limit.

10 Claims, 2 Drawing Sheets

METHOD AND SYSTEM FOR ESTIMATING VEHICLE SPEED REFERENCE VALUE

TECHNICAL FIELD

This invention relates generally to Anti-lock Brake Systems (ABS). More particularly, this invention relates to an improved method and system for estimating vehicle speed reference values (VREF) so as to prevent false slip detection and premature ABS activation.

BACKGROUND ART

In an effort to protect vehicle operators and occupants, vehicle manufacturers and their suppliers continue to direct their efforts to the design and manufacture of vehicles with additional and improved safety features. One such safety feature that has been incorporated into a number of vehicle types is Anti-lock Braking Systems (ABS) which can take a variety of forms.

Such ABS systems are generally designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems comprise a vehicle wheel speed sensor for providing input to an anti-lock brake system control unit. The control unit controls an anti-lock brake system control valve interposed between the brake master cylinder and the individual wheel brake of a hydraulic brake circuit. The control valve, in turn, regulates hydraulic brake fluid pressure in the individual wheel brakes so as to implement anti-lock braking.

In most systems, raw wheel speed is low pass filtered to reduce spurious noise. Generally, such filtering is accomplished through the use of a first order filter with the result stored. The filtered wheel speed is referred to by those skilled in the art as FVEL. Differentiation and further filtering yields wheel deceleration and wheel jerk.

From a control velocity, wheel behavior is characterized by higher order derivatives. The determined signals of filtered wheel speed (FVEL), filtered wheel deceleration and wheel jerk may be used to detect the onset of instability. (departure) so as to effect washboard surface rejection and to further identify wheel recovery.

In operation, the vehicle wheel speed sensor not only measures the vehicle wheel speed, but also provides input to the control unit for determining an estimated reference speed (VREF) for the vehicle at the corresponding wheel and ABS channel. In normal operation, the wheel speed references are decayed so as to ensure maximum braking efficiency while providing a reference for slip detection.

The wheel speed references (VREFs) for each of the control channels are used to calculate the average vehicle speed (AVEL). Different proportioning is, of course, used in the averaging calculation between the front and rear wheel speed references so as to optimize the accuracy of the estimated vehicle speed reference. The resultant estimated vehicle speed reference is used for system control and is also required for the calculation of vehicle deceleration.

The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity at a wheel and the vehicle velocity (AVEL).

Next, the control unit compares the vehicle wheel velocity to the vehicle velocity to determine a departure depth. Again, using the vehicle velocity as a reference, departure depth may be expressed as the difference between the vehicle velocity and the wheel velocity. During normal vehicle braking, the wheel velocity closely matches the vehicle velocity. Thus, during normal vehicle braking, the difference between the vehicle velocity and the wheel velocity is nominal.

During an anti-lock braking event, however, the wheel velocity decreases significantly below, or "departs" from the corresponding vehicle reference velocity. In such a situation, as for example during hard braking and on ice-covered roads, the frictional force between the vehicle brake pads and the vehicle brake drum/disc exceeds that between the vehicle wheel and the road surface. Uncontrolled, such a frictional force differential causes the vehicle wheel to cease rotating, or to "lock".

In turn, locking causes the vehicle wheels to slip or "skid", rather than roll over the road surface. Such vehicle wheel skidding dramatically reduces traction and the ability of the vehicle operator to bring the vehicle to a controlled stop.

To prevent such vehicle wheel lock in the accompanying problems, the control unit of an anti-lock brake system activates the anti-lock brake system control valve to regulate the hydraulic brake fluid pressure in the individual wheel brakes during an anti-lock braking event. More specifically, the control unit compares the departure depth to the slip threshold and activates the control valve when the departure depth exceeds the slip threshold. This is done in order to isolate the individual vehicle wheel brakes in the hydraulic brake circuit from the master cylinder, thereby halting any increase in brake fluid pressure in the vehicle wheel brakes and preventing incipient vehicle wheel lock.

More particularly, when, during vehicle braking, the departure depth exceeds the slip threshold, the control valve isolates brake fluid in the individual wheel brakes from the increasing brake fluid pressure in the master cylinder in order to hold brake fluid pressure in the wheel brake constant. If the isolated brake fluid pressure applied to the wheel brakes is still high enough to cause incipient wheel lock, the anti-lock brake system then bleeds, or dumps, brake fluid from the wheel brake to reduce brake fluid pressure therein.

Thereafter, the anti-lock brake system typically holds brake fluid pressure in the wheel brake constant until such time as the departure depth no longer exceeds the slip threshold, indicating the vehicle wheel is again traveling at or near the velocity of the vehicle. At that time, the anti-lock brake system then increases, or builds, brake fluid pressure in the wheel brake by reapplying brake fluid thereto. Reapplication of brake fluid to the wheel brake may be at a steep or gradual rate, or some combination thereof, depending upon the circumstances or the control desired.

One problem associated with the above-described prior art anti-lock brake systems is the possibility for false, or premature activation. Premature activation can occur in a number of circumstances, such as where a road surface is partially ice-covered or bumpy and individual vehicle wheels experience different coefficients of friction during braking. Typical anti-lock brake systems activate when the departure depth of any one of the vehicle wheels exceeds the slip threshold, despite the fact that the wheel would not have experienced excessive slip.

Moreover, typical anti-lock brake systems decrease the slip threshold after activation in order to increase anti-lock brake system sensitivity during an anti-lock braking event. Under normal conditions, this action improves the ability of the vehicle operator to slow or stop the vehicle in a controlled fashion. However, in the event of premature activation of the anti-lock brake system, such activation merely compounds the problem of the Anti-lock brake System.

In addition to the above-noted problems, undesirable results can also be obtained when one or more of the vehicle wheels are determined to be in spin-up, i.e., if the actual vehicle speed is lower than the wheel speed and the estimated reference speed (VREF). More particularly, if one wheel is in spin-up, a compare circuit which is comparing values from other wheels will indicate that an increase in reference speed is desired. However, when the spin-up goes away on the wheel in question, slip will be indicated on all wheels and the anti-lock braking system will be required to isolate and dump off all the pressure. This is, of course, an undesirable event.

So-called "spin-up" protection has been used in prior art anti-lock braking systems and has heretofore normally been triggered at a single predetermined acceleration, regardless of vehicle speed. Thus, for all AVEL, if the rate of change in wheel speed (acceleration) of a given wheel exceeded the threshold, spin-up protection was triggered. The vehicle speed reference value was then adjusted accordingly or, at a minimum, was determined to be in error.

While the prior art spin-up protection technique is a marked improvement, it does not provide accurate reference information at all estimated vehicle speeds, i.e., the possible acceleration of a vehicle is not a constant across the possible range of vehicle speeds.

Consequently, a need has developed for an improved method of estimating a vehicle speed reference value (VREF) which more closely tracks the relationship between estimated vehicle speed and wheel acceleration so as to prevent false slip detection and premature ABS activation.

SUMMARY OF THE INVENTION

It is a principal object of the present invention to provide an improved spin-up detection system.

It is a further object of the present invention to overcome the limitations of the prior art anti-lock braking systems and providing an improved method and system for estimating vehicle speed reference values (VREFs).

In carrying out the above-stated objects and other features and advantages of the present invention, the method is directed for use with a motor vehicle equipped with an anti-lock braking system (ABS) and includes the initial determination of a maximum possible rate of change of velocity for the vehicle over a predetermined range of corresponding vehicle speeds (ACCEL limit). The method further includes the determination of wheel speed, which, in the preferred embodiment, is the filtered velocity of wheel speed (FVEL). Still further, the method includes the determination of an estimated reference speed for the vehicle at the wheel (VREF). By comparing the determined wheel speed to the determined reference speed (VREF), it may further be determined if the determined wheel speed is less than the VREF. If so, this would indicate that the wheel is in slip and the VREF is decayed at a predetermined rate based upon the maximum possible rate at which the vehicle could decelerate at the given speed.

The method further includes the determination of the rate of change of the wheel speed (wheel acceleration). By comparing the determined rate of change of the wheel speed to the corresponding ACCEL limit at the determined reference speed (VREF), the relationships between wheel speed and VREF and wheel acceleration and the ACCEL limit may further be determined. More particularly, if the wheel speed is greater than the VREF and wheel acceleration is less than the ACCEL limit, the VREF value will be set equal to the determined wheel speed. This is the condition where the vehicle is accelerating normally thus VREF is set equal to wheel speed.

In contrast, if the wheel speed is greater than the VREF and the wheel acceleration is also greater than the ACCEL limit, the VREF will be limited to the corresponding ACCEL limit. Each of the above steps, with the exception of the determination of the ACCEL limit, is repeated on a real-time basis over a predetermined time interval so as to provide spin-up protection with improved accuracy.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
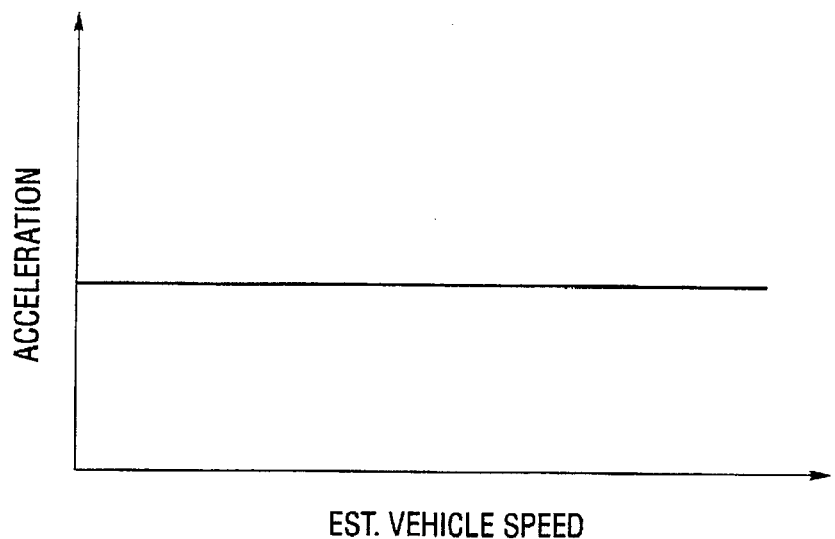
FIG. 1 is a graphical illustration of a prior art approach to spin-up protection.
Figure 2:
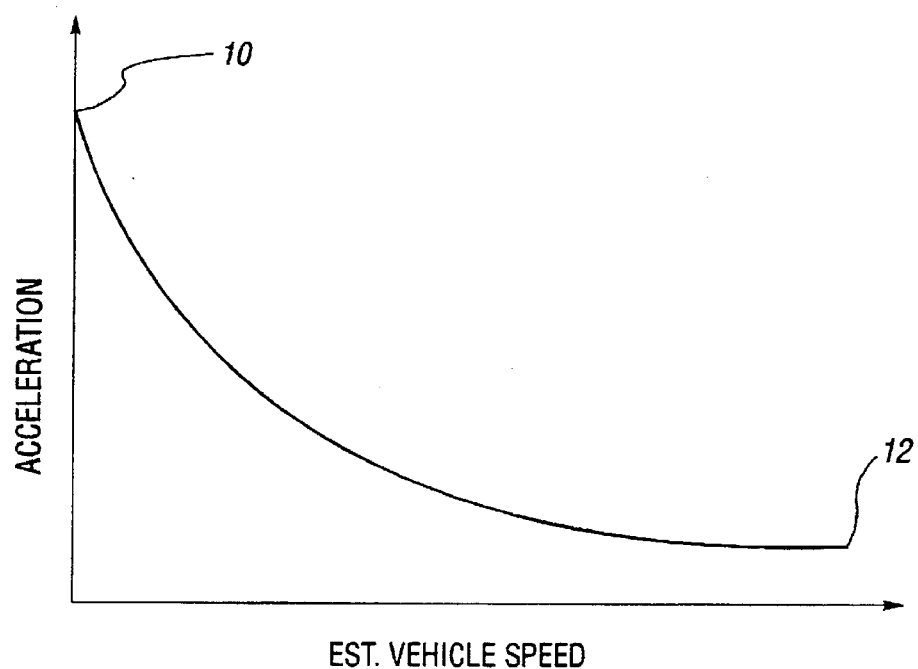
FIG. 2 is a graphical illustration of the relationship between estimated vehicle speed and vehicle acceleration referenced by the present invention to achieve improved spin-up protection.

FIG. 1 graphically illustrates the above-described prior art approach to spin-up protection. As shown, such protection is triggered any time the estimated vehicle speed exceeds a single predetermined acceleration. Clearly, this approach is inappropriate over the full range of vehicle speeds since the relationship between vehicle speed and wheel acceleration is not a constant. Rather, as shown in FIG. 2 of the drawings, there is an inverse relationship between the possible rate of change of velocity for a wheel and the estimated vehicle speed. As speed increases, acceleration is correspondingly limited. Conversely, as speed decreases, greater acceleration becomes possible. Thus, the maximum possible acceleration is at 10, where the estimated vehicle speed is at or near zero. Similarly, the minimum possible acceleration is at 12, where the estimated vehicle speed is at or near peak.

In keeping with the invention, plotted curve of FIG. 2 is determined through trial and error and is provided with a margin to allow for increases in acceleration that might result due to possible road surface gradations.

Figure 3:
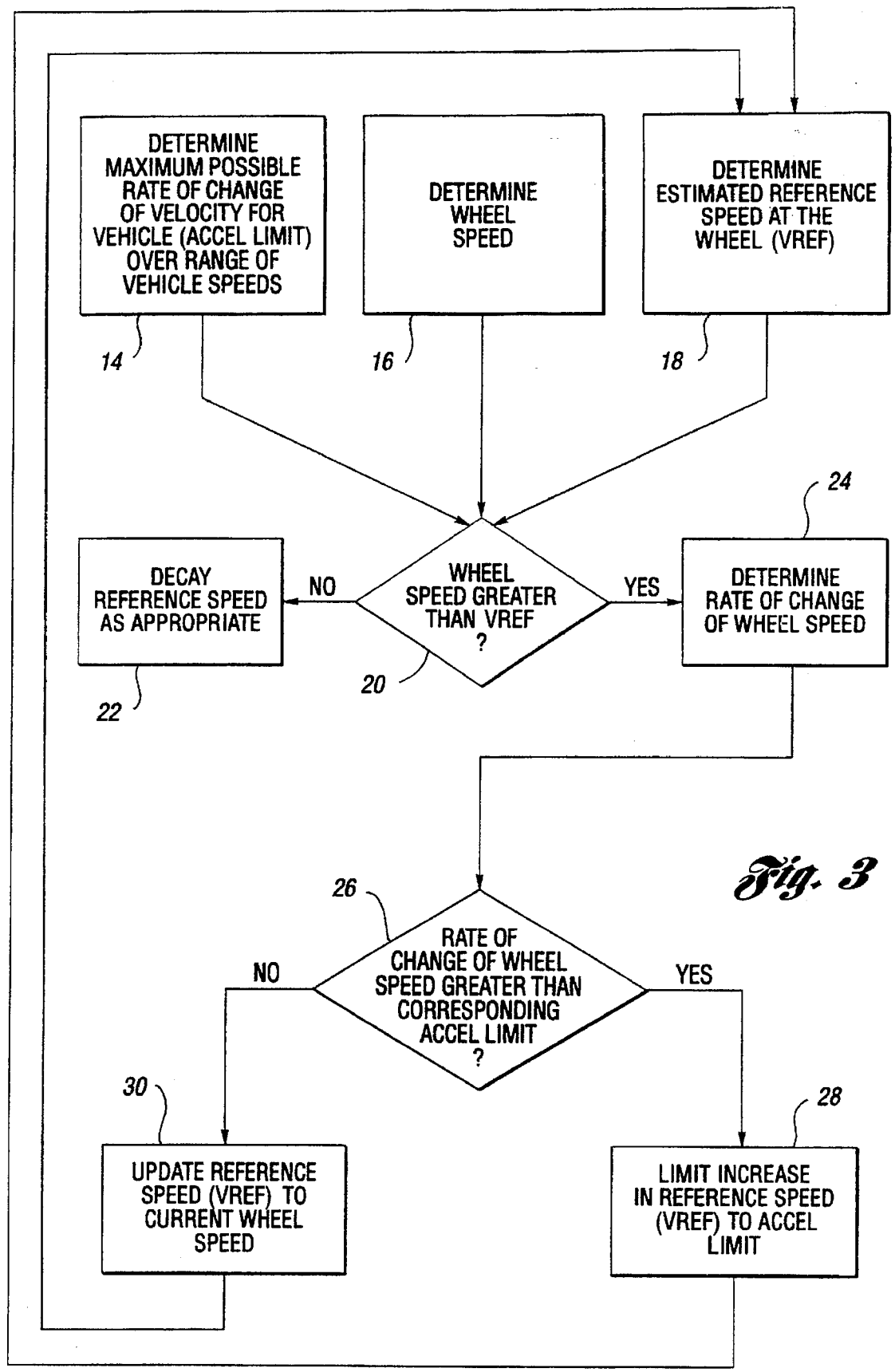
FIG. 3 is a generalized flow diagram of the method of the present invention.

A generalized flow diagram illustrating the method of the present invention is further shown in FIG. 3. As referenced above, the method requires the initial determination of a maximum possible rate of change of velocity for the vehicle (ACCEL limit) over a predetermined range of corresponding vehicle speeds as indicated at block 14. The method further requires determination of wheel speed and preferably the filtered velocity of wheel speed (FVEL) as indicated at block 16. Yet still further, as shown at block 18, an estimated reference wheel speed for the vehicle at the wheel (VREF) must be determined in accordance with the determined wheel speed.

Once these initial determinations have been made, the wheel speed is compared to the determined reference speed (VREF) as shown at block 20. If the wheel speed is less than the VREF, the VREF is decayed at a predetermined rate as shown at block 22. As indicated above, this decay or "RAMP DOWN" is necessary because the vehicle could be decelerating even though the wheel is determined to be in slip.

In further keeping with the invention, if the wheel speed is greater than the reference speed, the rate of change in wheel speed (wheel ACCEL) must be determined as shown at block 24 and this value must be compared to the corresponding ACCEL limit at the estimated reference speed (VREF) as shown at block 26. If the rate of change in wheel speed is greater than the possible rate of change for the vehicle, i.e., the ACCEL limit, there is clearly an error and the determined reference speed (VREF) is limited to the ACCEL limit as shown at block 28. In contrast, if the rate of change in wheel speed is not greater than the possible rate of change for the vehicle at the estimated reference speed, then the reference speed is updated to the current wheel speed as shown at block 30. These steps are repeated on a real-time basis over a predetermined time interval so as to provide a more accurate determination of vehicle speed reference. In the preferred embodiment, this interval is approximately 5 milli seconds.

In further keeping with the invention, if the vehicle is under ABS control, the ACCEL limit may be limited to a first predetermined value for all determined reference speeds. In the preferred embodiment this limit may be typically set at the level of acceleration of a wheel recovery to vehicle speed. In the preferred embodiment this step may be performed because it is undesirable to closely limit the acceleration of the reference because if the departure goes deep and the reference is under estimated, it will be required to be updated. If it is limited, the next departure may be missed. Thus, once ABS is determined to be active, the first predetermined value for the acceleration limit is provided for. Still further, if it is determined that there is spin-up on all wheels, this would typically indicate a four-wheel drive vehicle on ice or an indeterminate corruption of speed signals. Thus ACCEL limit may be limited to a second predetermined value for all reference speeds. This second predetermined value is lower than the first predetermined value and is generally set to the value of maximum acceleration that could be achieved on ice.

A system operable in accordance with the above teachings includes a speed sensor and a controller. The controller is provided in electrical communication with the speed sensor and is operable to determine on a real-time basis both the estimated vehicle speed (VREF) and a rate of change of the wheel speed (ACCEL). The controller includes a compare circuit for comparing and limiting VREF to the ACCEL limit if the ACCEL exceeds the ACCEL limit.

While the best modes for carrying out the invention have been described in detail, those familiar with the art to which this invention relates will recognize various alternative designs and embodiments for practicing the invention as defined by the following claims.

What is claimed is:

1. For use with a motor vehicle equipped with an Anti-Locking Braking System (ABS), an improved method of estimating a vehicle speed reference value (VREF) at a wheel so as to prevent false slip detection and false ABS activation, the method comprising:

(a) determining a corresponding ACCEL limit having a value which is a function of a corresponding vehicle speed;

(b) determining wheel speed;

(c) determining an estimated reference speed (VREF) for the vehicle at the wheel in accordance with said determined wheel speed;

(d) comparing said wheel speed to the estimated reference speed;

(e) decaying said estimated reference speed at a predetermined rate in response to said wheel speed<VREF;

(f) determining a rate of change of the wheel speed;

(g) comparing the determined said rate of change of the wheel speed to the corresponding ACCEL limit at said estimated reference speed;

(h) setting VREF=wheel speed if said wheel speed>VREF and said rate of change of the wheel speed<ACCEL limit;

(i) limiting VREF to the corresponding ACCEL limit if said wheel speed>VREF and said rate of change of the wheel speed>ACCEL limit; and (j) repeating steps (b)–(i) on a real-time basis over a predetermined time interval.

2. The method of claim 1, further comprising limiting said ACCEL limit to a first predetermined value for all determined reference speeds in response to said vehicle being under ABS control.

3. The method of claim 2, wherein said first predetermined value is the level of acceleration of a wheel recovery to said corresponding vehicle speed.

4. For use with a motor vehicle having a plurality of wheels and equipped with an Anti-Locking Braking System (ABS), an improved method of estimating vehicle speed reference values (VREFs) at each of the wheels for preventing false slip detection and false ABS activation, the method comprising:

(a) determining an ACCEL limit which is a function of a corresponding vehicle speed;

(b) determining a determined wheel speed for each of the wheels;

(c) determining a VREF value corresponding to an estimated reference speed for the vehicle at each of the wheels in accordance with said determined wheel speeds;

(d) comparing each of the determined wheel speeds to their corresponding VREF value;

(e) decaying said VREF value at a predetermined rate for each wheel, in response to said wheel speed<VREF value;

(f) determining rate of change of wheel speed for each wheel;

(g) comparing for each wheel, said rate of change of each wheel speed to said ACCEL limit at the corresponding value;

(h) setting said VREF value=wheel speed for each wheel, in response to said wheel speed>VREF value and said rate of change<ACCEL limit;

(i) limiting said VREF value to the corresponding ACCEL limit for each wheel, in response to said wheel speed>VREF value and said rate of change of wheel speed>ACCEL limit; and (j) repeating steps (b)–(i) on a real-time basis over a predetermined time interval.

5. The method of claim 4, further comprising limiting ACCEL limit to a first predetermined value for all determined reference speeds in response to said ABS control being activated.

6. The method of claim 5, wherein said first predetermined value is the level of acceleration of a wheel recovery to said corresponding vehicle speed.

7. The method of claim 4, further comprising determining a filtered wheel speed for all wheels, and limiting ACCEL limit to a second predetermined value for all determined reference speeds when said filtered wheel speed is greater than said VREF value, said second predetermined value being less than said first predetermined value.

8. The method of claim 7, wherein the second predetermined value is a maximum acceleration value that could be achieved by the wheel on ice.

9. For use with a motor vehicle equipped with an Anti-locking Braking System (ABS), an improved spin-up detection system comprising:

a speed sensor for generating a wheel speed signal;

a controller responsive to said wheel speed signals for determining on a real-time basis estimated vehicle speed, and a rate of change of said wheel speed signals, said controller further including storage means for storing an ACCEL limit which is a function of a corresponding vehicle speed, and a compare circuit for comparing and limiting said estimated vehicle speed to said ACCEL limit if said rate of change of said wheel speed exceeds said ACCEL limit.

10. For use with a motor vehicle equipped with an Anti-locking Braking System (ABS), an improved method of estimating a vehicle speed reference value at a wheel so as to prevent false slip detection and false ABS activation, the method comprising:

(a) determining an ACCEL limit which is a function of a corresponding vehicle speed;

(b) determining wheel speed;

(c) determining an estimated reference speed for the vehicle in accordance with said wheel speed;

(d) comparing the wheel speed to the estimated reference speed;

(e) determining a rate of change of the wheel speed;

(f) comparing said rate of change of the wheel speed to the corresponding ACCEL limit at the estimated reference speed;

(g) limiting the estimated wheel speed to said ACCEL limit in response to said rate of change of the wheel being greater than ACCEL limit; and (h) repeating steps (b)–(g) on a real-time basis.

* * * * *